United States Patent
Chen-Lung et al.

(10) Patent No.: US 6,834,160 B1
(45) Date of Patent: Dec. 21, 2004

(54) ELECTRIC HEATER WITH A SENSOR PREVENTING NO-WATER HEATING

(76) Inventors: Huang Chen-Lung, P.O. Box 2-10, Tainan City (TW); Huang Chuan Pan, P.O. Box 2-10, Tainan City (TW)

( * ) Notice: Subject to any disclaimer, the term of this patent is extended or adjusted under 35 U.S.C. 154(b) by 0 days.

(21) Appl. No.: 10/715,274

(22) Filed: Nov. 14, 2003

(51) Int. Cl.[7] .................................... F24H 1/18
(52) U.S. Cl. .................................... 392/441; 219/443.1
(58) Field of Search .............................. 219/385, 443.1, 219/446.1, 447.1, 518; 392/441, 442; 73/1.73, 149, 290 R, 304 R, 304 C

(56) References Cited

U.S. PATENT DOCUMENTS

| | | | | |
|---|---|---|---|---|
| 4,714,822 A | * | 12/1987 | Braun et al. | 219/448.12 |
| 5,294,779 A | * | 3/1994 | Miquelot | 219/447.1 |
| 6,259,069 B1 | * | 7/2001 | Schotten et al. | 219/447.1 |
| 6,462,316 B1 | * | 10/2002 | Berkcan et al. | 219/502 |

* cited by examiner

Primary Examiner—Thor S. Campbell

(57) ABSTRACT

An electric heater with a sensor for preventing no-water heating includes a heating plate and/or a metal plate fixed on the heating plate, a heating film electro-plated on a lower surface of the heating plate, and a water level probe, or a sensing electrode, or a water level sensor and a temperature fuse fixed with the heating plate. The water level probe, the sensing electrode or the water level sensor produces alteration of electric potential in case of the water level becoming very low, triggering a switch of an A/D amplifying circuit automatically cutting off power of the heating film.

10 Claims, 4 Drawing Sheets

ELECTRIC HEATER WITH A SENSOR PREVENTING NO-WATER HEATING

FIELD OF THE INVENTION

This invention relates to an electric heater with a sensor for preventing no-water heating, particularly to one provided with a water level probe, a sensing electrode for detecting the water level stored in a water tank on a heater so as to automatically cut off power of an electric heating film, enhancing safety in use of an electric heating appliance.

BACKGROUND OF THE INVENTION

An electric oven disclosed in a Taiwan patent application of publication number 301523 includes a heater made of micro-crystal plane glass coated with a heating film on a lower surface of the glass for producing heat. But it has a drawback of possible cracking by external force, leading to water or electricity leakage and subsequent danger to the user.

Another Taiwan patent application of publication number 319373 entitled "Water heater provided with a heating film" includes a heating chamber made of insulating material, and a heating film provided in the heating chamber, and the insulating material is made of micro-crystal glass, which has the same problem and drawback as the case of No. 301523.

Another Taiwan patent application of publication number 509453 entitled "Electric heating disc" includes a heat-transmitting disc, a heating film member, heat-insulating cotton, and a frame plate. The heating film member produces heat to be transmitted to the heat-transmitting disc, and is made of an electric heating tube or piece, with the heat-transmitting disc indirectly heated up, this kind of heating disc has inferior heat efficiency.

Another Taiwan patent application of publication number 427500 entitled "Heating plate of an electric heater" includes a heating plate made of porcelain, glass and steel and coated with enamel, and a tubular or plate heater is placed in the heating plate, which has the problem of inferior heat efficiency.

SUMMARY OF THE INVENTION

The objective of the invention is to offer an electric heater with a sensor for preventing no-water heating, by means of automatic cutting off power of the electric heating film with provision of a water level sensor, so as to enhance the safety in using an electric heating appliance.

The invention has the following features.

1. An electric heater with a sensor for preventing no-water heating has a heating plate with its lower surface electroplated with an electric heating film for producing heat electrically, and the heat is transmitted to and by the heating plate to obtain high heating efficiency.

2. An electric heater with a sensor for preventing no-water heating has a metal plate fixed on the heating plate for strengthening the upper surface of the heating plate.

3. An electric heater with sensor for preventing no-water heating has a water-level probe or a sensing electrode provided on a proper location of the heating plate and extending upward or downward the heating plate to directly detect the water level in a water tank.

An electric heater with a sensor for preventing no-water heating has a temperature sensor and a temperature fuse to perform detection of the water level and controlling of the temperature.

BRIEF DESCRIPTION OF DRAWINGS

This invention will be better understood by referring to the accompanying drawings, wherein.

DETAILED DESCRIPTION OF THE INVENTION

Figure 1:
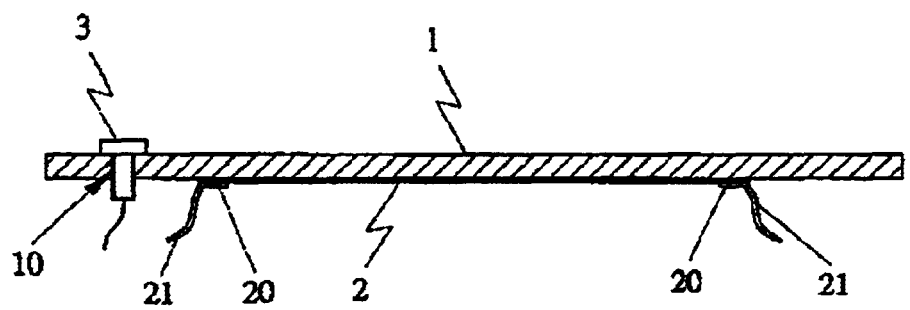
FIG. 1 is a cross-sectional view of a first embodiment of an electric heater in the present invention.

A first embodiment of an electric heater with a sensor for preventing no-water heating, as shown in FIG. 1, includes a heating plate 1, an electric heating film 2, and a water level probe 3.

Figure 8:
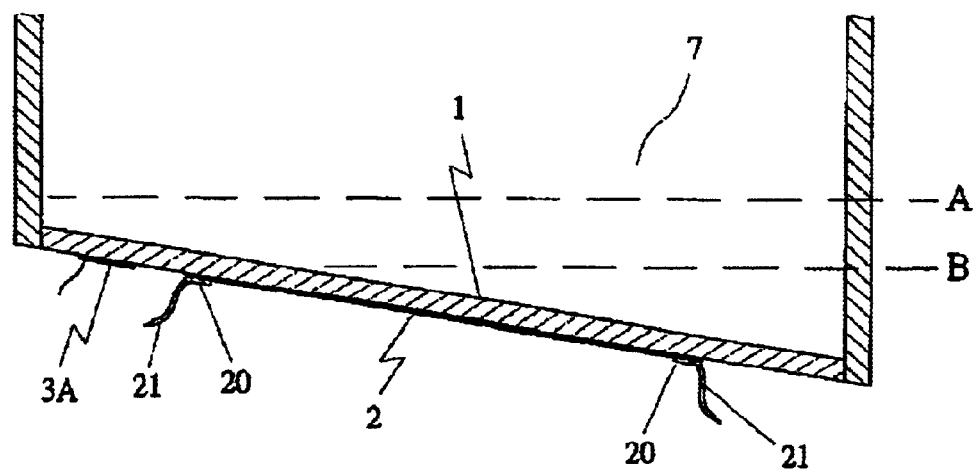
FIG. 8 is a cross-sectional view of an electric heater fixed in another way in the present invention.
Figure 9:
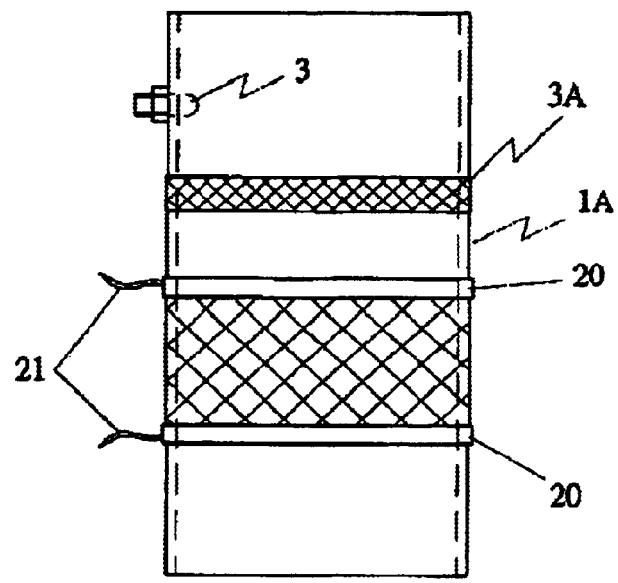
FIG. 9 is a cross-sectional view of a seventh embodiment of an electric heater in the present invention; and, FIG. 10 is a diagram of a control circuit of the electric heater in the present invention.
Figure 10:
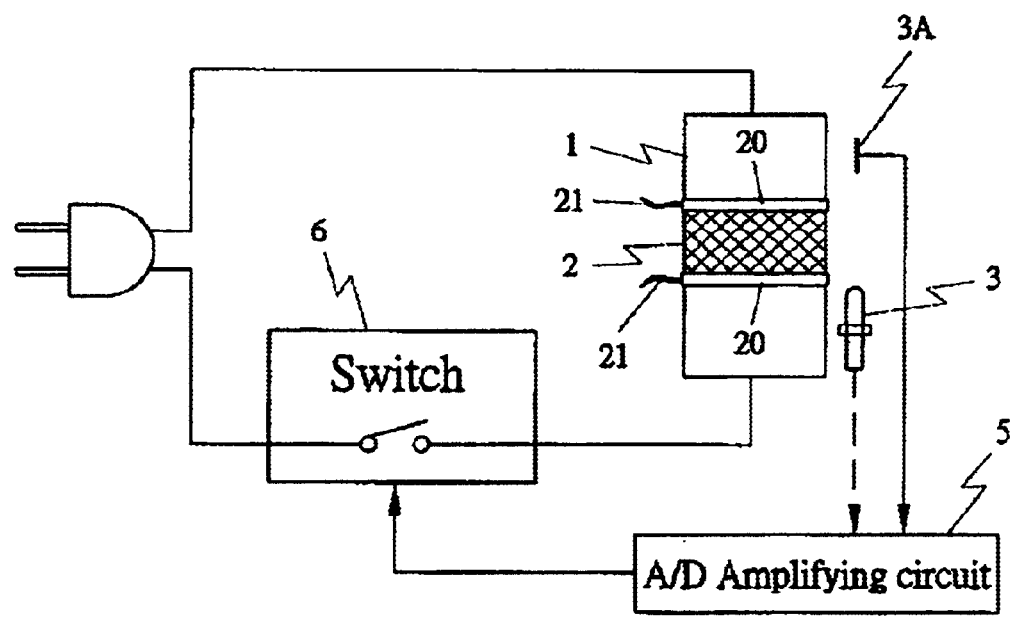

The heating plate 1 is preferably made of micro-crystal plane glass, porcelain, quartz, or other electrically insulating material, having a vertical hole 10, and the electric heating film 2 is electroplated on a lower surface of the heating plate 1, which has at last two silver terminals 20 to connect with wires 21. Then, the electric heating film 2 produces heat by electricity, and the heat generated is transmitted to the heating plate 1, so the electric heater can be applied to various heating devices, such as coffee pots, a drinking water dispenser, an electric water heater, etc. Further the water level probe 3 is fitted in the vertical hole 10, or more than one probes 3 may be used if needed. The function of the water level probe 3 is to produce alternation of electric potential to send a signal of that condition to an A/D amplifying circuit 5 as shown in FIG. 10, when the water level in a water tank 7 moves slowly down from the line A (showing a safe water level and the sensing electrode still no triggering alteration of electric potential) in FIG. 8 and reaches the line B, that is the level of little or almost no water, with the water level probe 3 affected by the highly heated heating plate 1, as shown in FIGS. 8, 9 and 10. Then the A/D amplifying circuit sends a signal to a switch 6 to cut off the power of electric heating film 2 automatically, thus preventing no-water heating of the heating film 2, and enhancing safety in using the heater.

Figure 2:
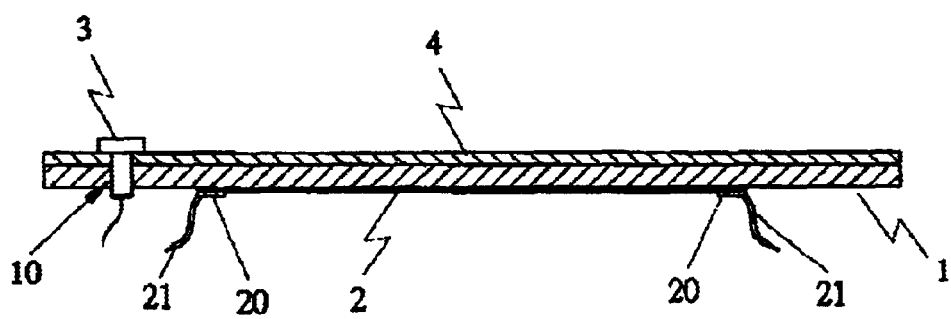
FIG. 2 is a cross-sectional view of a second embodiment of an electric heater in the present invention.

Next. FIG. 2 shows a second embodiment of an electric heater with a sensor for preventing no-water heating in the present invention, only differing from the first embodiment in that a metal plate 4 is additionally provided on the heating plate 1. The metal plate 4 is made of steel, iron, aluminum, aluminum alloy, or stainless steel, etc. having high heat transmitting coefficient. Preferably, metal plate 4 is made of steel which also has good shock-enduring feature.

Figure 3:
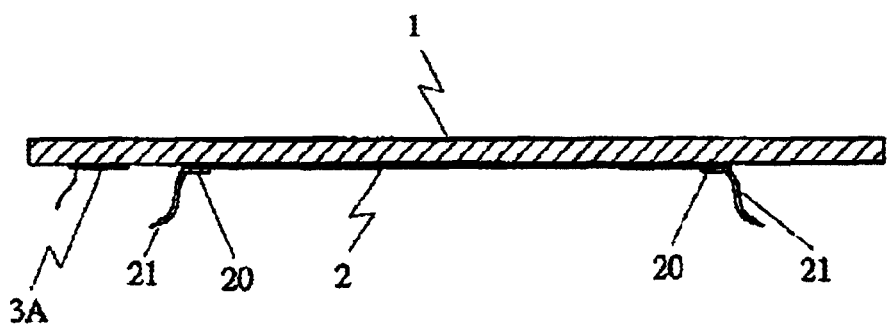
FIG. 3 is a cross-sectional view of a third embodiment of an electric heater in the present invention.

Further, FIG. 3 shows a third embodiment of the invention, different from the first embodiment in that a sensing electrode 3A is attached on a lower surface of the heating plate 1. As shown in FIGS. 8, 9 and 10, when the water level is at the line A, a normal water level, the sensing electrode 3A does not trigger to send an output of alteration of electric potential. But when the water level moves down to the line B, an abnormal water level of little water, the sensing electrode 3A may sense alteration of electric potential to feed a signal to the control A/D amplifying circuit 5, which then sends a signal to the switch 6, which then cuts off the power of heating film 2 automatically, preventing the heating film 2 from heating under no-water condition, and enhancing safety of the heater.

Figure 4:
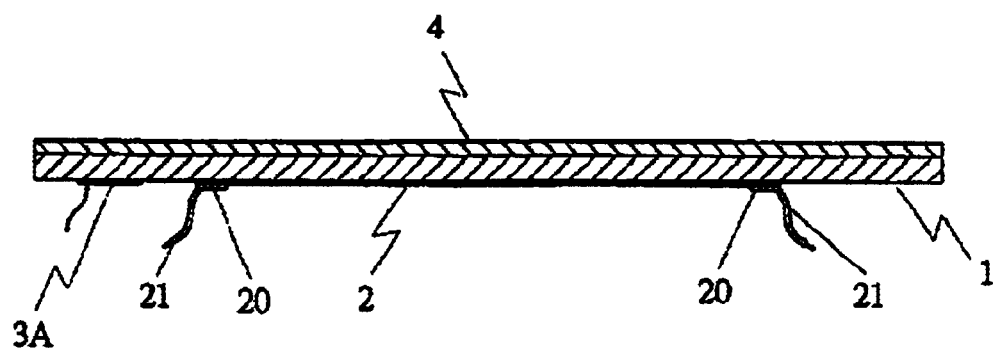
FIG. 4 is a cross-sectional view of a fourth embodiment of an electric heater in the present invention.

Further, FIG. 4 shows a fourth embodiment of the invention, modified from the third embodiment, only differing from the third one in that a metal plate 4 is additionally provided on the heating plate 1. Metal plate 4 is made of steel, iron, aluminum, aluminum alloy, or stainless steel of high heat transmitting coefficient. Preferably, metal plate 4 is made of steel which also has shock-endurance.

Figure 5:
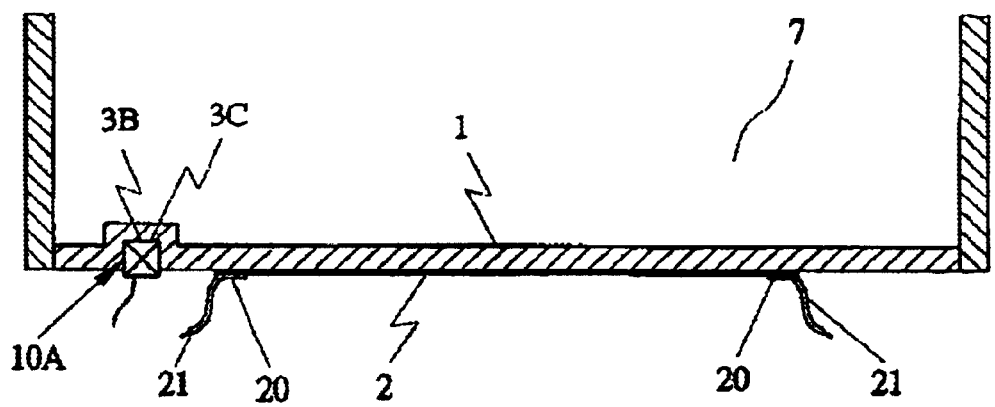
FIG. 5 is a cross-sectional view of a fifth embodiment of an electric heater in the present invention.

FIG. 5 shows a fifth embodiment of the invention, having the same structure as the first one except that the heating plate 1 has a projection or a recess 10A, where a water level sensor 3C and a temperature fuse 3B are received, functioning as the same as the sensing electrode 3A to detect the water level, to let the heating film 2 automatically cut off power.

Figure 6:
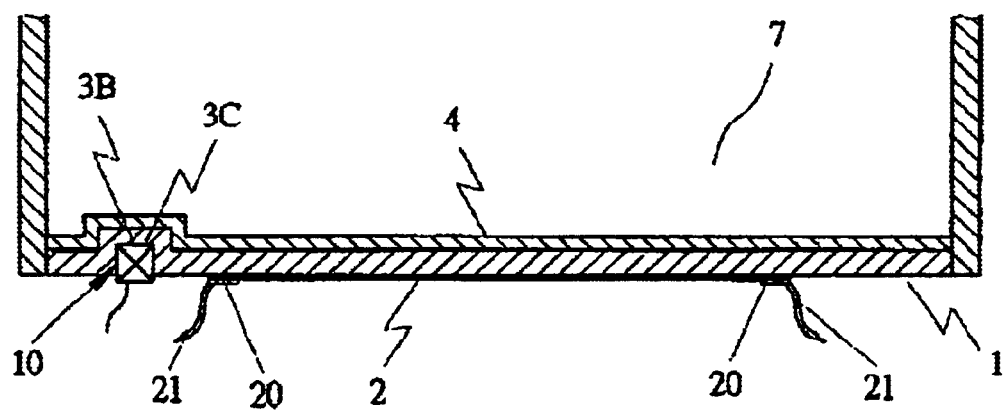
FIG. 6 is a cross-sectional view of a sixth embodiment of an electric heater in the present invention.
Figure 7:
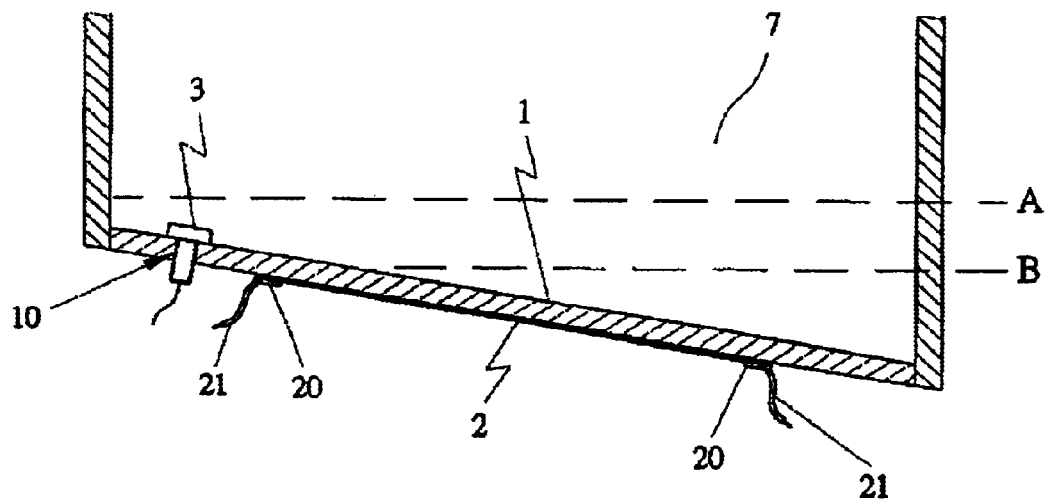
FIG. 7 is a cross-sectional view of an electric heater fixed in one way in the present invention.

Further, FIG. 6 shows a sixth embodiment of the invention, modified from the fifth embodiment, and differing in that a metal plat 4 is additionally provided on the heating plate 1, which is made of steel, iron, aluminum, aluminum alloy, or stainless steel of high heat transmitting coefficient. Preferably, metal plate 4 is made of steel which also has shock-endurance.

FIG. 9 shows a seventh embodiment of the invention, possible to be applied to all the embodiments described above. The seventh one includes a heating cylinder 1A, and a heating film 2 electroplated on an intermediate portion of the heating cylinder 1A, two silver terminals 2 attached with the heating film 2 to be connected with wires 21, and a water level probe 3 or an sensing electrode 3A is fixed with the heating cylinder 1A to detect the water level to let the heating film 2 automatically cut off power in case of little or no water remained in a water tank on the heating plate, so as to enhance the safety in using the heater.

In short, the electric heater with a sensor for preventing no-water heating according to the invention has a heating film directly provided on the heating plate to increase heating efficiency, and a water level probe, a sensing electrode or a water level sensor with a temperature fuse to let the heating film automatically cut off power in case of little or no water remained in a water tank on the heating plate, preventing the heater from danger of no-water heating, and enhancing safety.

While the preferred embodiments of the invention have been described above, it will be recognized and understood that various modifications may be made therein and the appended claims are intended to cover all such modifications that may fall within the spirit and scope of the invention.

What is claimed is:

1. An electric heater with a sensor for preventing no-water heating comprising:

a heating plate provided with a vertical hole, having a heating film electroplated on a lower surface and two silver terminals fixed with said heating film for connecting with wires;

a water level probe fixed in said vertical hole of said heating plate for detecting water level of the water stored in a water tank on said heating plate, producing alteration of electric potential in case of sensing a very low water level, wherein said alteration of electric potential is fed to a control circuit, said control circuit then operates to automatically cut power off said electric heating film.

2. The electric heater with a sensor for preventing no-water heating as claimed in claim 1, wherein a metal plate is additionally provided on said heating plate.

3. An electric heater with a sensor for preventing no-water heating comprising:

a heating plate having a heating film electro-plated on a lower surface thereof and two silver terminals fixed with said heating film for connecting with wires;

a sensing electrode is provided on the lower surface of said heating plate for sensing water level of the water stored in a water tank on said heating plate, producing alteration of electric potential in case of sensing a very low water level wherein, said alteration of electric potential is fed to a control circuit, said control circuit then operates to automatically cut power off said electric heating film.

4. The electric heater with a sensor for preventing no-water heating as claimed in claim 3, wherein a metal plate is additionally provided on said heating plate.

5. An electric heater with a sensor for preventing no-water heating comprising:

a heating plate having a heating film electro-plated on a lower surface thereof and two silver terminals fixed with said heating film for connecting with wires, wherein the heating plate has a recess on the lower surface;

a water level sensor with and a temperature fuse provided in the recess on the lower surface of said heating plate for sensing water level of the water stored in a water tank on said heating plate, producing alteration of electric potential in case of sensing a very low water level, wherein said alteration of electric potential is fed to a control circuit, said control circuit then operates to automatically cut power off said electric, heating film.

6. The electric heater with a sensor for preventing no-water heating as claimed in claim 5, wherein a metal plate is additionally provided on said heating plate.

7. The electric heater with a sensor for preventing no-water heating as claimed in claim 1, wherein said heating plate is cylindrical.

8. The electric heater with a sensor for preventing no-water heating as claimed in claim 1, wherein said heating plate has a recess.

9. The electric heater with a sensor for preventing no-water heating as claimed in claim 1, said heating plate has a projection.

10. The electric heater with a sensor for preventing no-water heating as claimed in claim 1, wherein said control circuit includes an A/D amplifying circuit, which magnifies signals coming from said water level probe; and then sends the magnified signals to a switch, said switch automatically cuts off the power of said heating film when receiving the magnified signals.

* * * * *